US011003959B1

(12) United States Patent
Levner et al.

(10) Patent No.: US 11,003,959 B1
(45) Date of Patent: May 11, 2021

(54) VECTOR NORM ALGORITHMIC SUBSYSTEMS FOR IMPROVING CLUSTERING SOLUTIONS

(71) Applicant: AMAZON TECHNOLOGIES, INC., Seattle, WA (US)

(72) Inventors: Ilya Levner, Woodinville, WA (US); Konstantinos Boulis, Redmond, WA (US); Gurbinder Gill, Seattle, WA (US); Canku Calargun, Redmond, WA (US); Prajwal Yadapadithaya, Seattle, WA (US); Venkata Krishnan Ramamoorthy, Redmond, WA (US); Zhaoqing Ma, Sammamish, WA (US)

(73) Assignee: Amazon Technologies, Inc., Seattle, WA (US)

( * ) Notice: Subject to any disclaimer, the term of this patent is extended or adjusted under 35 U.S.C. 154(b) by 42 days.

(21) Appl. No.: 16/440,384

(22) Filed: Jun. 13, 2019

(51) Int. Cl.
*G06K 9/62* (2006.01)
*G06N 3/04* (2006.01)
*G06N 3/08* (2006.01)
*G06K 9/68* (2006.01)

(52) U.S. Cl.
CPC ......... *G06K 9/6276* (2013.01); *G06K 9/6218* (2013.01); *G06K 9/6259* (2013.01); *G06K 9/6807* (2013.01); *G06N 3/0454* (2013.01); *G06N 3/08* (2013.01)

(58) Field of Classification Search
CPC ............. G06K 9/00154; G06K 9/6276; G06K 9/6218; G06K 9/6259; G06K 9/6807; G06T 2207/20081; G06T 2207/20084; G06N 3/084; G06N 3/0454; G06N 3/088; G06N 3/08; G06N 3/02; G06N 20/00
See application file for complete search history.

(56) References Cited

U.S. PATENT DOCUMENTS

| | | | | |
|---|---|---|---|---|
| 2019/0065594 | A1* | 2/2019 | Lytkin | G06F 16/9536 |
| 2019/0251442 | A1* | 8/2019 | Koivisto | G06N 3/082 |
| 2019/0347554 | A1* | 11/2019 | Choi | G06N 3/04 |
| 2020/0026942 | A1* | 1/2020 | Jiang | G06N 3/04 |
| 2020/0210680 | A1* | 7/2020 | Shreve | G06T 7/55 |

FOREIGN PATENT DOCUMENTS

CN 110232436 A * 9/2019

* cited by examiner

*Primary Examiner* — Jingge Wu
(74) *Attorney, Agent, or Firm* — Patterson + Sheridan, LLP

(57) ABSTRACT

Categorizing images may include training a first neural network to cluster a plurality of images to obtain a first image embedding space, wherein a vector representation is determined for each of the plurality of images based on the training, determining a vector norm value corresponding to each of the plurality of images based on the vector representation for each of the plurality of images, and identifying a first subset of the images for which a corresponding vector norm value satisfies a predetermined vector norm quality threshold. Then, a second neural network may be trained using the first subset of images to obtain a second image embedding space, and the second image embedding space may be used to categorize additional images.

20 Claims, 5 Drawing Sheets

VECTOR NORM ALGORITHMIC SUBSYSTEMS FOR IMPROVING CLUSTERING SOLUTIONS

BACKGROUND

With the rise of mobile devices, users have started to capture more and more images. With the increase in images and other media collected by users, the need for organization methods of the media items becomes more necessary. As an example, face recognition may be used to identify photos or images of a distinct individual. However, training a network to identify a face on naturally captured photos may be difficult because user photos are often of lower quality than those used as training data in a factory context. As such, training a network on user photos may be unreliable and expensive.

BRIEF DESCRIPTION OF THE DRAWINGS

For a detailed description of various examples, reference will now be made to the accompanying drawings in which.

DETAILED DESCRIPTION

Figure 1:
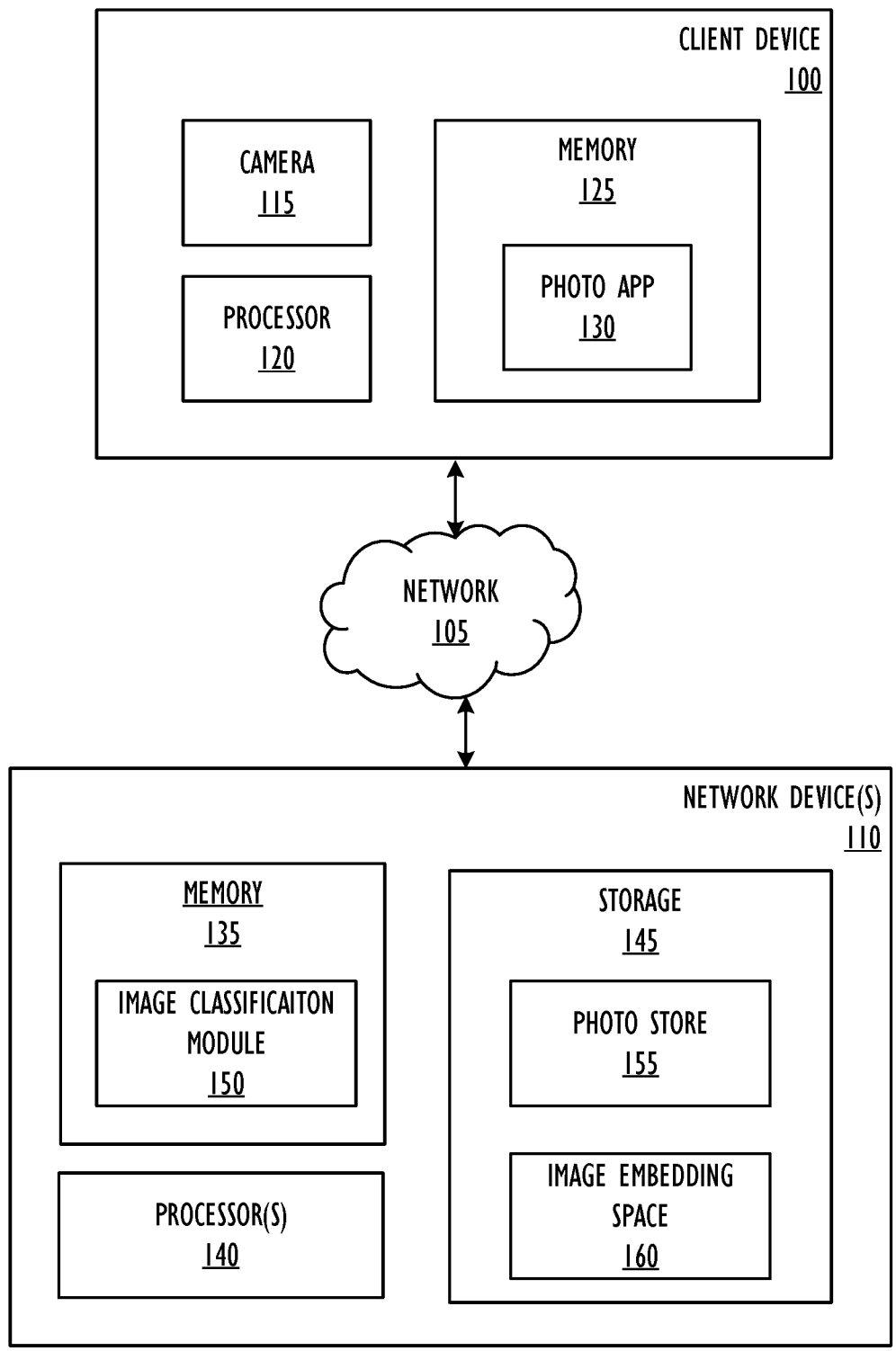
FIG. 1 shows an example network diagram in which aspects of the disclosure may be practiced, according to one or more embodiments.

Clustering solutions may be improved utilizing vector norm values for image data, according to one or more embodiments. As an example, an image may be processed to obtain a representative vector (e.g., a feature embedding) using a deep neural network. The various embeddings for different images may be fed into a clustering algorithm to generate clusters of images within an image embedding space. While embedding vectors are usually normalized, the non-normalized vector norm can be utilized to improve the clustering technique. As such, the vector norm described herein should be understood to refer to the non-normalized vector norm. According to one or more embodiments, any vector norms may be used, such as L1 norms, L2 norms, L3 norms, LK, L0, and L∞ norms. It may be preferable, for image data, to utilize L2 norm values.

In one or more embodiments, the vector norm may be utilized to detect poor quality images. A low vector norm value may indicate low quality image content. For purposes of this disclosure, the term "quality" refers to aspects of an image which make the image easier or more difficult to categorize. As an example, a low quality image may include a bur, speckle noise, and the like. Because the vector norm is based on the vector values, a low vector norm may indicate low vector values, which may in turn indicate that a particular image is difficult to categorize, or has few identifiable characteristics. Because user media libraries may include many images that are low quality, a trained neural network based on a user media library may result in a low performing neural network. As such, the neural network may be improved by utilizing high quality images. Thus, in one or more embodiments, once an vector norm is determined for each photo or image in a collection, images with low vector norms may be discarded, and a neural network may be trained with the remaining images (e.g., the images associated with higher vector norm values). The result is a more efficient neural network which may be used to categorize additional images.

The vector norm may also be utilized to remove low quality clusters in addition to, or as an alternative to, the detection and removal of low quality images. As an example, once images have been embedded in an image embedding space, clusters of images may be identified. Then, a representative vector norm may be identified for each cluster. In one or more embodiments, clusters with low representative vector norms may indicate that the clusters include mixed concepts, or are otherwise a poor cluster. The clusters with lowest representative vector norms may be removed from the embedding space such that additional images are not improperly categorized based on the low quality clusters.

Further, in one or more embodiments, the vector norm may be used to optimize the processing of large data sets. As an example, a user may have a library or a set of images to categorize. As the number of items to process increases, the memory required is squared, and the time required is cubed. The quadratic memory usage implies that a clustering technique cannot scale past a certain size in a collection. However, the vector norm of the images may be used to recursively process the images. In one or more embodiments, the images may initially be sorted based on their vector norm. A first set of images may be selected with the highest vector norms and which comprise some predetermine amount of memory, such as a capacity of an available memory. The first set of images may be processed using the clustering algorithm to embed the images in an embedding space to create a plurality of clusters. Then, the remaining images may be categorized by being assigned to a cluster based on proximity to the cluster. That is, each of the remaining images will be evaluated to determine whether a representative vector for the image is within a predetermined proximity of any of the clusters, such as a threshold distance. Those remaining images that are within the proximity will be assigned to the cluster. In one or more embodiments, assigning images to the cluster may include obtaining a label for the cluster, such as a user-provided label indicating that the remaining non-clustered, non-assigned images are then processed anew. That is, the remaining non-clustered, non-assigned images are initially evaluated to determine whether they satisfy the size threshold (e.g., they fit in the memory capacity). If the remaining non-clustered, non-assigned images satisfy the size threshold, then they are processed using the clustering algorithm to generate a second embedding space, and the process ends. Otherwise, the process repeats, and the images with the highest vector norm values are utilized to generate a new embedding space, the remaining images are assigned or set aside, until all the images fit in the memory.

In the following description, numerous specific details are set forth to provide a thorough understanding of the various techniques. As part of this description, some of the drawings represent structures and devices in block diagram form. In this context, it should be understood that references to numbered drawing elements without associated identifiers (e.g., 100) refer to all instances of the drawing element with identifiers (e.g., 100a and 100b). Further, as part of this description, some of this disclosure's drawings may be provided in the form of a flow diagram. The boxes in any particular flow diagram may be presented in a particular order. However, it should be understood that the particular flow of any flow diagram is used only to exemplify one embodiment. In other embodiments, any of the various components depicted in the flow diagram may be omitted, or the components may be performed in a different order, or even concurrently. In addition, other embodiments may include additional steps not depicted as part of the flow diagram. Further, the various steps may be described as being performed by particular modules or components. It should be understood that the language used in this disclosure has been principally selected for readability and instructional purposes, and may not have been selected to delineate or circumscribe the disclosed subject matter. As such, the various processes may be performed by alternate components than the ones described.

Reference in this disclosure to "one embodiment" or to "an embodiment" means that a particular feature, structure, or characteristic described in connection with the embodiment is included in at least one embodiment, and multiple references to "one embodiment" or to "an embodiment" should not be understood as necessarily all referring to the same embodiment or to different embodiments.

FIG. 1 shows an example network diagram comprising components which may be utilized for various techniques described herein, according to one or more embodiments. FIG. 1 includes a client device 100 connected to one or more network devices 110 over a network 105. Client device 100 may comprise a personal computer, a tablet device, a smart phone, a smart wearable device, base station, network device, or any other electronic device which may be used to capture and/or manage images captured by a camera. The network 105 may comprise one or more wired or wireless networks, wide area networks, local area networks, short range networks, etc. Users of the client device 100 can interact with the network devices 110 to access services controlled and/or provided by the network devices 110.

Client Device 100 may include one or more processors 120. Processor 120 may include multiple processors of the same or different type. Client Device 100 may also include a memory 125. Memory 125 may each include one or more different types of memory, which may be used for performing functions in conjunction with processor 120. For example, memory 125 may include cache, ROM, RAM, or any kind of transitory or non-transitory computer readable storage medium capable of storing computer readable code which may be executed by processor 120. Memory 125 may store various programming modules for execution by processor 120, including photo application 130.

In one or more embodiments, client device 100 may include camera 115. Camera 115 may include one or more cameras from which images may be captured. A user of client device 100 may manage images captured by the camera using the photo application 130. In one or more embodiments, the photo application may manage the photos captured by the camera by providing a user interface through which a user may view and organize photos. In one or more embodiments, the photo app may automatically organize photos captured by camera 115, or may communicatively connect to network device 110 to utilize functionality across a network to manage the photos and/or other image data captured by client device 100.

Network device 110 may include similar components and functionality as those described in client device 100. Specifically, network device may include a memory 130, storage 145, and one or more processors 140. As described above, memory 135 may include cache, ROM, RAM, or any kind of transitory or non-transitory computer readable storage medium capable of storing computer readable code which may be executed by processor 140. Storage 145 may include may include storage media or memory media such as semiconductor storage, magnetic or optical media, e.g., disk or CD/DVD-ROM, or other storage technologies.

Storage 145 may include various data stores, such as photo store 155. In one or more embodiments, photo store 155 may be utilized to store image data, such as photos captured by client device 100, in network storage. Storage 145 may also include an image embedding space store 160. In one or more embodiments, image classification module 150 may be utilized to categorize images based on a clustering algorithm. In one or more embodiments, the result may be one or more photo embedding spaces in which images are classified and clustered to identify commonalities among the images. According to one or more embodiments, the embedding space may refer to a generic vector representation by which images are characterized. Clusters may include groups of embedded representations of images into an abstract embedding space based on values in the representations. According to one or more embodiments, clusters may include one or more representation of an image which is substantially different than other individual representations of images or groupings (e.g., clusters) of representations of images.

In one or more embodiments, image classification module 150 utilizes a deep neural network to take an image, such as a photo, and produce a feature embedding in the form of a vector representative of characteristics of the photo. Multiple embeddings, or vectors, in a collection may then be fed into a clustering algorithm and grouped together to identify commonalities. In one or more embodiments, the embeddings, or vectors, referred to a particular vector for which the vector values correspond to a particular image. According to one or more embodiments, image classification module may leverage vector values associated with the images being categorized based on the deep neural network in order to improve upon classification algorithms.

According to one or more embodiments, the classification module 150 ranks photos to be categorized based on vector norm value. The vector norm value may be determined based on the vector representation for each photo generated based on the deep neural network. A low vector norm value may indicate a low quality image. In one or more embodiments, the image classification module 150 may filter out a predetermined number of images with the lowest L2 norm values, or may filter out images with vector norm values less than a threshold value. Then, the remaining images may be classified using a clustering algorithm to obtain an image embedding space that is more efficient and accurate than if an image embedding space was generated utilizing all of the photos (e.g., including the images with the low vector norm values). In one or more embodiments, the image embedding space may be stored in image embedding space 160 for classification of additional photos.

Further, in one or more embodiments, the image classification module may improve upon embedding spaces by removing clusters that may have little in common, or may contain low quality images. According to one or more embodiments, the image classification module 150 may filter low quality clusters in the embedding space. The image classification module may determine a representative vector norm value for each cluster. Then, the image classification module 150 may filter out a predetermined number of clusters with the lowest vector norm values, or may filter out clusters with vector norm values less than a threshold value. Then, additional images may be categorized using the modified embedding space.

Moreover, in one or more embodiments, the vector norm may be used to optimize the processing of large data sets. By iteratively clustering a subset of images of a large set of images, the images may be classified even if the full image set does not fit in memory. The image classification module 150 may prioritize images with the highest vector values to generate the embedding space within which the remaining images may be classified. Further, if any of the remaining images are unable to be classified may be processed to generate a second embedding space, and the process may continue iteratively until all the images are processed.

Although client device 100 and network device 110 are depicted as comprising the numerous components described above, in one or more embodiments, the various components may be distributed differently, or across additional devices (e.g., multiple client devices and/or multiple network devices). Particularly, in one or more embodiments, one or more of the photo application 130, image classification module 150, photo store 155, and image embedding space 160 may be distributed differently across the client device 100 and network device 110. Accordingly, although certain calls and transmissions are described herein with respect to the particular systems as depicted, in one or more embodiments, the various calls and transmissions may be made differently directed based on the differently distributed functionality. Further, additional components may be used, some combination of the functionality of any of the components may be combined.

Figure 2:
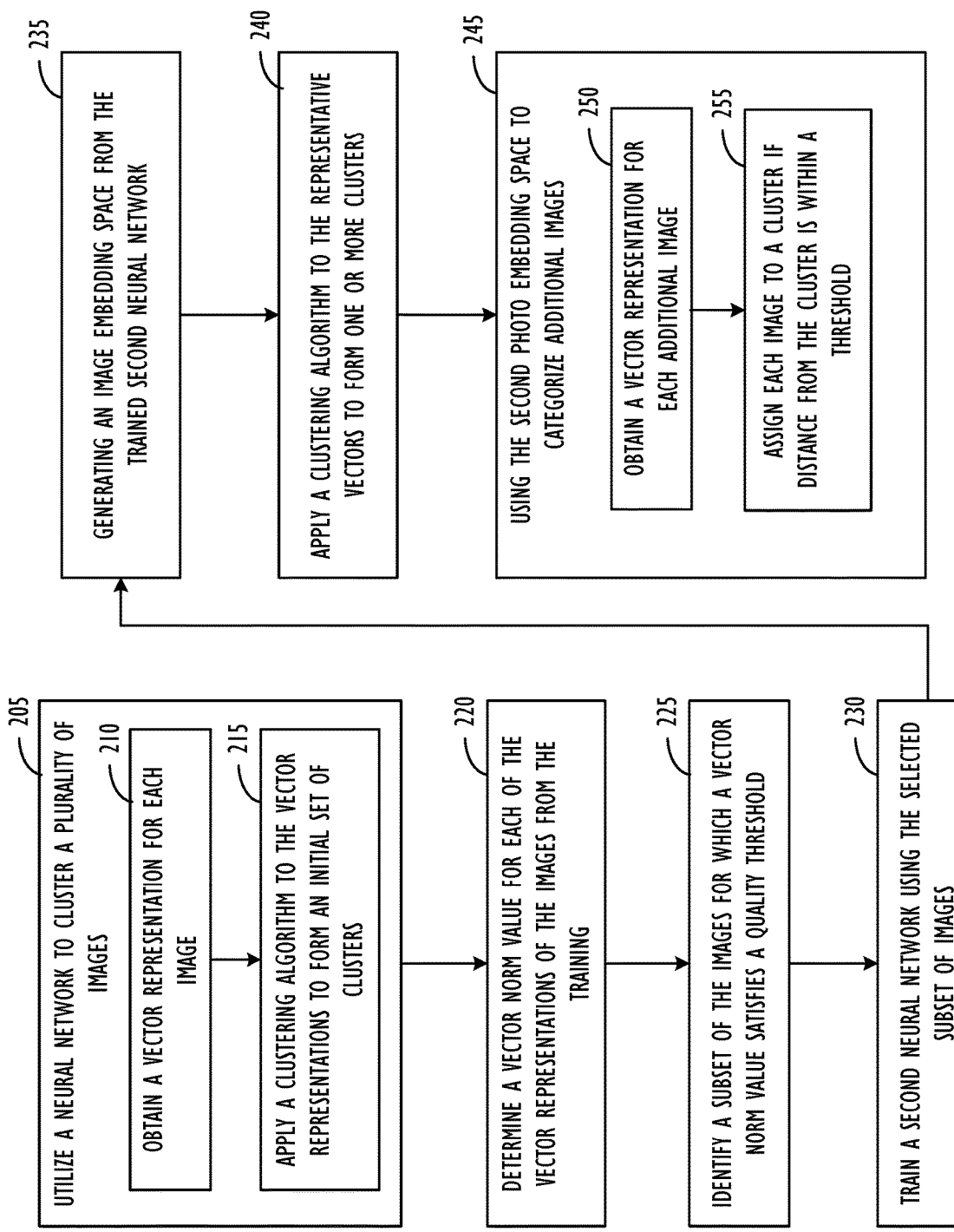
FIG. 2 illustrates a flowchart of a method for improving a neural network by removing low quality images, according to one or more embodiments.

FIG. 2 illustrates a flowchart of a method for improving a neural network by removing low quality images, according to one or more embodiments. For purposes of explanation, the following steps will be described in the context of FIG. 1. However, it should be understood that the various actions may be taken by alternate components. In addition, the various actions may be performed in a different order. Further, some actions may be performed simultaneously, and some may not be required, or others may be added.

At 205, the image classification module 150 utilizes a neural network to cluster a plurality of images. In one or more embodiment, the neural network may be a deep neural network that generates a feature embedding for each photo and may utilize the feature embedding to embed the images (or, more specifically, representations of the images) into an image embedding space. The embedding may be in the form of a vector in which the vector values are indicative of characteristics of the images. As shown at 210, in one or more embodiments, a vector representation for each image may be obtained based on the neural network. Then, at block 215, a clustering algorithm may be applied to the vector representations to form an initial set of clusters. According to one or more embodiments, the initial set of clusters indicates a closeness between the vector representations for the various images.

The flowchart continues at 220 where the classification module determines a vector norm value for each of the vector representations of the images from the training. According to one or more embodiments, the vector norm may indicate a distance of the vector from an origin, and may be calculated based on the vector values. As an example, an L2 norm may be utilized. The L2 norm may be calculated as follows:

$$L2 = \sqrt{a_1^2 + a_2^2 + a_3^2 \ldots a_n^2}$$

where $a_n$ represents a particular value in the vector representation of the image. According to one or more embodiments, each value in the vector may represent a particular characteristic or lack of a characteristic in the image. A characteristic of the image may be any component which may identify aspects of the image, such as subjects in the image, context of the image, locations in the image, and the like, as well as lighting and other image characteristics.

At 225, the image classification module 150 identifies a subset of the images for which a vector norm value satisfies a quality threshold. The vector value may be indicative of a quality of the image. For example, an L2 norm for a vector representation for a particular image may be indicative of a quality of the particular image. Thus, in one or more embodiment, the quality threshold may indicate a base vector norm value which should be utilized for generating an embedding space in order to categorize images. In another example, the threshold may indicate a particular number of images which should be kept or removed from the embedding space (e.g., the images with the top 100 vector norm values should be kept, and/or the images with the 30 lowest vector norm values should be removed).

At 230, the image classification module trains a second neural network using the selected subset of images. In one or more embodiments, training the second neural network with the subset of images results in a more efficient (e.g., smaller, more accurate, etc.) neural network because it should include more "clean" image data than the first neural network. According to one or more embodiments, because the photos utilized in the whole set of images at block 205 and the subset of images at block 225 are different, a vector representation for an image may differ based on the training of the first neural network in the second neural network. More specifically, the values within the vector may differ because the photo is being compared to a different set of photos in each situation.

The flowchart continues at 235 the image classification module 150 generates an image embedding space form the second trained neural network. According to one or more embodiments, the image embedding space may be a multidimensional space in which each dimension is representative of one of the vector values, and the images may be embedded into the embedding space. The flowchart continues at block 240 where a clustering other than may be applied to the representative vectors to form one or more clusters-based on a clustering algorithm. As such, photos or other images with more characteristics in common will be embedded closer to each other than photos or images with fewer characteristics in common. According to one or more embodiments, the images may be embedded based on vector representations generated during the training of the second neural network (e.g., without consideration of the removed, or "dirty," image data).

The flowchart concludes at 245, the image classification module 150 uses the image embedding space to categorize additional images. As an example, the embedding space generated at 235 may be generated on a first library or a first set of images. A user may then characterize additional images, for example when the user captures additional images with the camera 115. Further, the user may import additional images to be categorized.

In one or more embodiments, categorizing the additional images may include, at 250, obtaining a vector representation of each additional image. As described above, the vector representation may be obtained by the trained deep neural network that was utilized to generate the image embedding space. Finally, at 255, the image classification module assigns each image to a cluster if the distance from the cluster is within a threshold distance. The distance may be determined, for example, on a vector distance between a representative vector for the cluster and the vector for the photo to be assigned. In one or more embodiments, assigning images to the cluster may include obtaining a label for the cluster, such as a user-provided label indicative of the common characteristics in the images, and applying the label to the assigned image or images based on the assignment. In one or more embodiments, some of the additional images may be embedded such that they are not assigned to a cluster or they form a new cluster.

Figure 3:
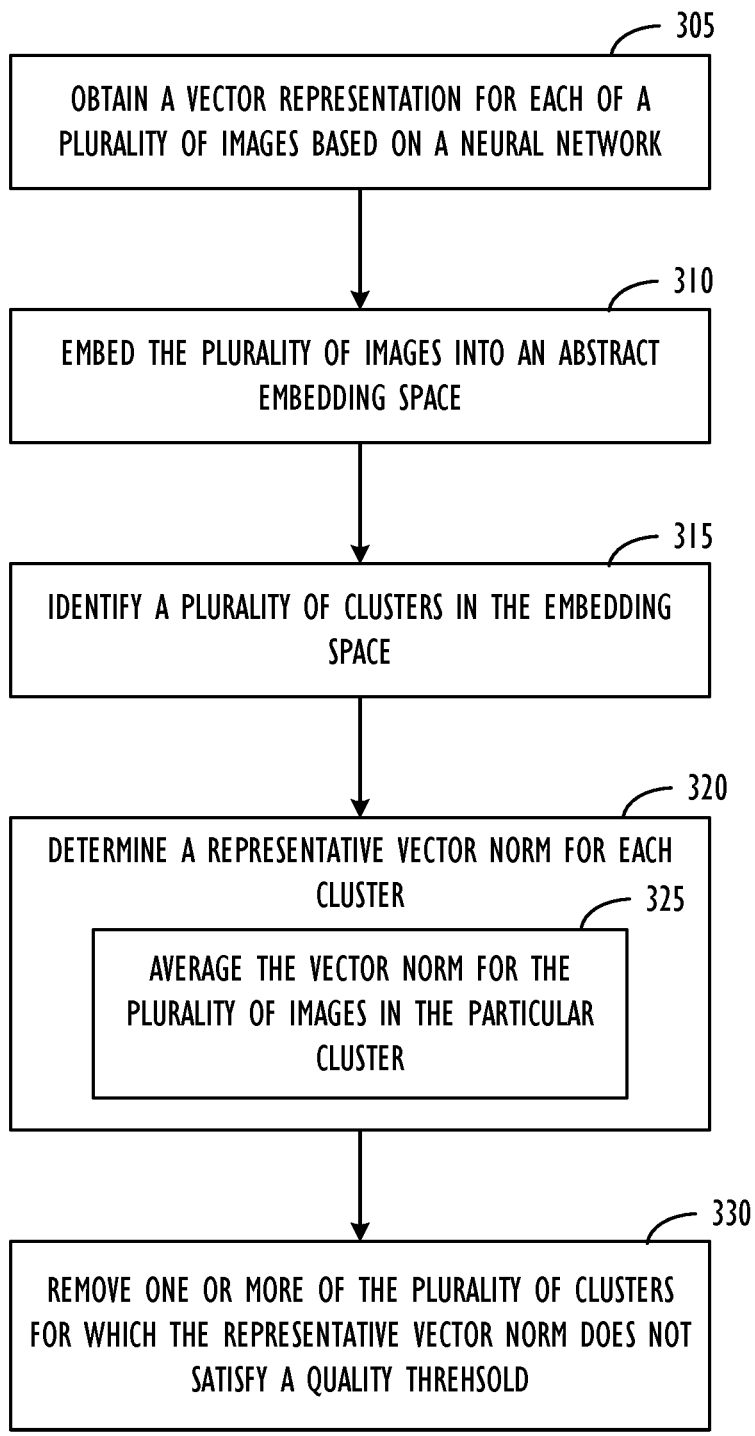
FIG. 3 illustrates a flowchart for improving clustering quality, according to one or more embodiments.

FIG. 3 illustrates a flowchart for improving clustering quality, according to one or more embodiments. A technique is described in which a representative vector value for each cluster in an embedding space is leveraged to identify and remove low quality clusters to improve performance of the clustering algorithm. For purposes of explanation, the following steps will be described in the context of FIG. 1. However, it should be understood that the various actions may be taken by alternate components. In addition, the various actions may be performed in a different order. Further, some actions may be performed simultaneously, and some may not be required, or others may be added.

The flowchart begins at 305 where the image classification module 150 obtains a vector representation for each of a plurality of images based on a neural network. As described above, a deep neural network may be trained to generate the vector representation. Then, at 310, the image classification module 310 embeds the plurality of images into an abstract embedding space. At 315 and the image classification module 150 identifies a plurality of clusters in the embedding space. As described above, clusters may be identified according to the clustering algorithm when images have more characteristics in common than other images.

The flowchart continues at 320 and the image classification module determines a representative L2 norm for each cluster. The representative vector norm for each cluster may be determined in any number of ways. In one or more embodiments, at 325, the image classification module 150 averages the vector norm for the plurality of images in the particular cluster to determine the representative vector norm value for the cluster. Alternatively, or additionally, the image classification module 150 may utilize a different value to determine the representative vector norm for each cluster. For example, the image classification module 150 may utilize a median vector norm, a mode vector norm, and the like. Further, various other functions may be used to determine any other function which may determine a quality metric from the vector norm values. In another embodiment, the representative vector norm may be determined by selecting a representative embedding, such as a central embedding within the cluster, and using the vector norm value for the representative embedding.

The flowchart concludes at 330 where the image classification module 150 removes one or more of the plurality of cluster for which the representative vector norm does not satisfy a quality threshold. In one or more embodiments, the clusters that are removed may be selected based on having a representative vector norm value that is less than a cluster vector norm value threshold. As another example, a threshold number of clusters may be removed which have the lowest representative vector values among the clusters in the embedding space.

Figure 4:
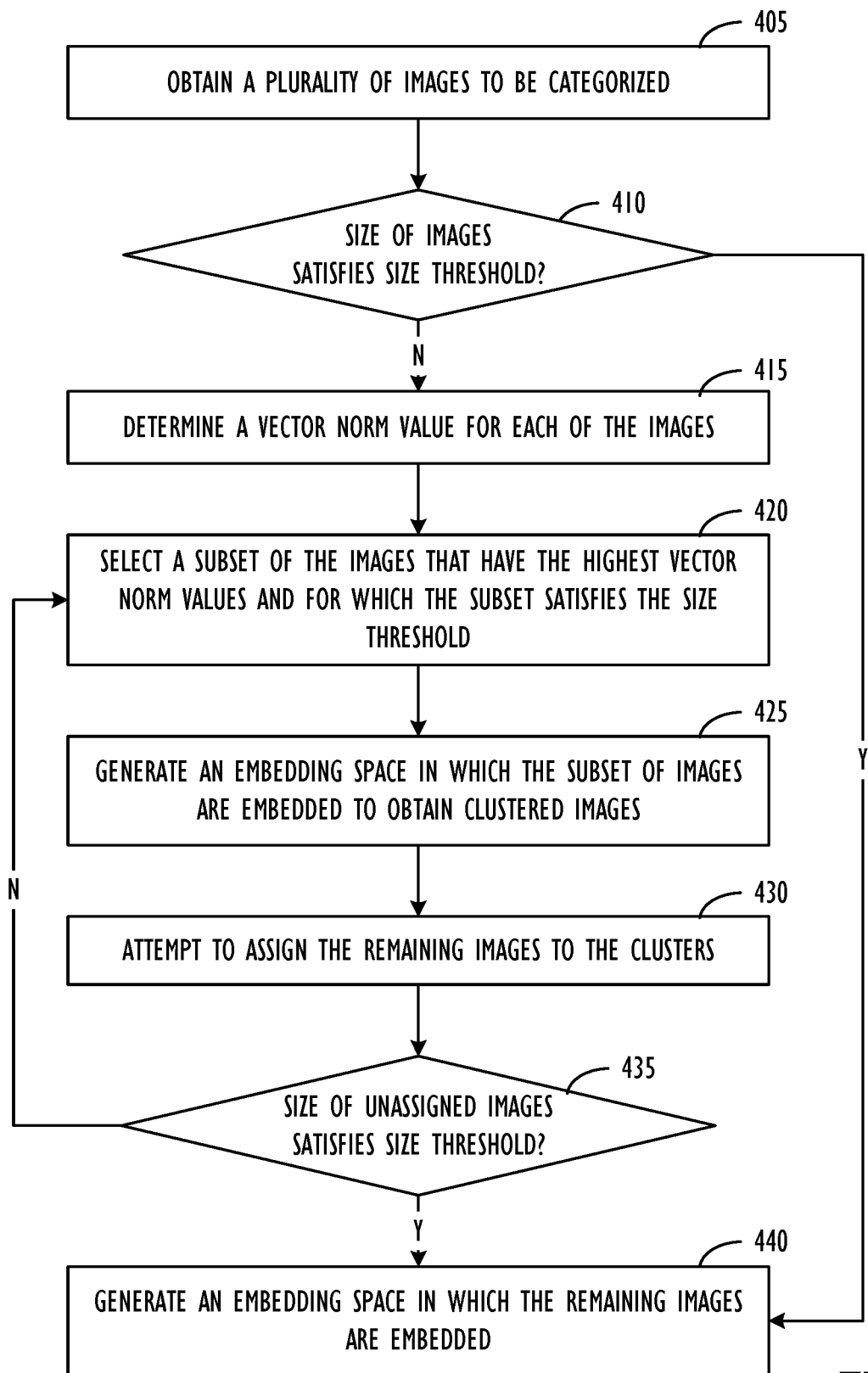
FIG. 4 illustrates a flowchart of a method for categorizing large data sets, according to one or more embodiments.

FIG. 4 illustrates a flowchart of a method for categorizing large data sets, according to one or more embodiments. In one or more embodiments, the vector norm value for the various images may be leveraged to perform an iterative classification technique that improves speed and/or memory usage by generating multiple embedding spaces. For purposes of explanation, the following steps will be described in the context of FIG. 1. However, it should be understood that the various actions may be taken by alternate components. In addition, the various actions may be performed in a different order. Further, some actions may be performed simultaneously, and some may not be required, or others may be added.

The flowchart begins at 405, where the image classification module 150 obtains a plurality of images to be categorized. The flowchart continues at 410 where a determination is made regarding whether a size of the images satisfies a size threshold. In one or more embodiments, the size threshold may indicate a maximum memory size based on a capacity of available memory in a system tasked with categorizing the images. If a determination as made at 410 that the size of the images satisfies the size threshold (that is, if the complete set of images fit in the allocated or available memory), then the flowchart continues at 440, and the image classification module 150 generates an embedding space in which the remaining images are embedded.

Returning to 410, if a determination is made that the size of the images does not satisfy a threshold (that is, the complete set of images do not fit in the allocated or available memory), then the flowchart continues at 415 and the image classification module 150 determines an vector norm value for each of the images. The vector norm value may be determined based on a deep neural network utilized to generate vector representations of the characteristics of the images. Then at 420, the image classification module 150 selects a subset of the images that have the highest vector norm values and for which the subset satisfies the size threshold. That is, the images with the top vector norm values are selected until a size threshold is reached, such as a memory capacity or other size determination (that is, the threshold may be less than the total capacity of the memory).

The flowchart continues at 425 where the image classification module 150 generates an embedding space in which the subset of images are embedded to obtain clustered images. In one or more embodiments, the images are embedded using a clustering algorithm. As described above, the images may be embedded based on similar characteristics expressed in the vector values. As such, images with common characteristics will be embedded near each other according to the clustering algorithm.

At 430, the image classification module 430 attempts to assign the remaining images to the clusters in the embedding space. The image classification module assigns each image to a cluster if the distance from the cluster is within a threshold. The distance may be determined, for example, on a vector distance between a representative vector for the cluster and the vector for the photo to be assigned. In one or more embodiments, assigning images to the cluster may include obtaining a label for the cluster, such as a user-provided label indicative of the common characteristics in the images, and applying the label to the assigned image or images based on the assignment.

In one or more embodiments, some of the additional images may not be able to be assigned. As such, the flowchart continues at 435 where a determination is made regarding whether a size of the unassigned images (that is, the un-clustered, unassigned images) satisfies a size threshold (that is, less than the available or allocated memory capacity). If a size of the unassigned images satisfies a size threshold, then the flowchart continues at 440 and the image classification module 150 generates an embedding space in which the remaining images are embedded and the process comes to an end. In one or more embodiments, the embedding space generated at 440 is a wholly new embedding space and does not take into consideration the images embedded in to the embedding space at 425.

Returning to block 435, if a determination is made that the size of the unassigned images does not satisfy the size threshold, then the process begins again and the flowchart continues at 420 where the image classification module selects a subset of the remaining images that have the highest vector norm values, embeds those images and assigns the remainder. This process continues recursively until the remaining unclustered, unassigned images satisfy the size threshold.

Figure 5:
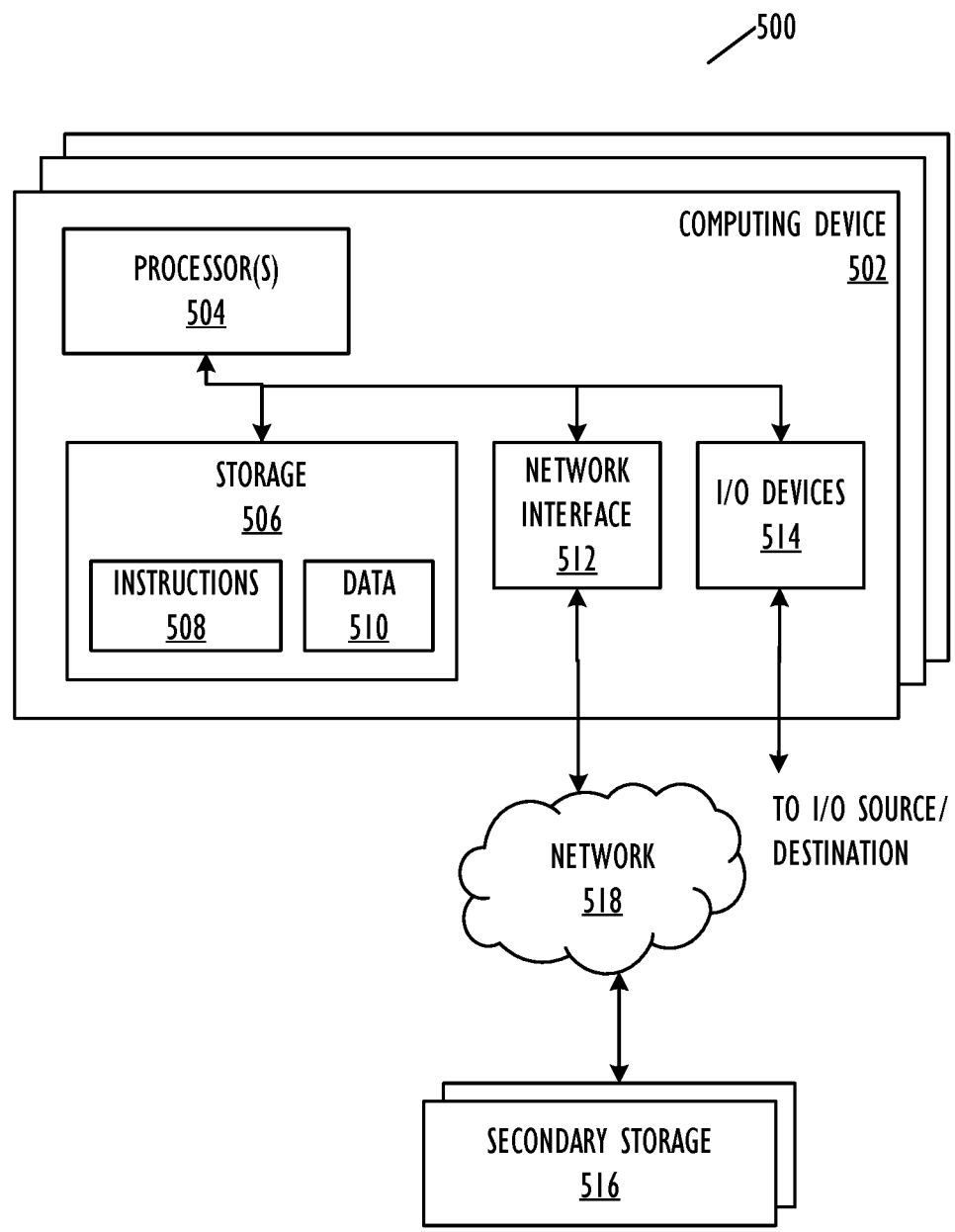
FIG. 5 shows an example of a hardware system for implementation of the improved clustering techniques in accordance with the disclosed embodiments.

FIG. 5 shows a schematic diagram for a computing system 500 suitable for implementation of any of the components of the client device 100 or network device 110 as described herein in accordance with various embodiments. The system includes one or more computing devices 502. The computing system 500 includes the computing devices 502 and secondary storage 516 communicatively coupled together via a network 518. One or more of the computing devices 502 and associated secondary storage 516 may be used to provide the functionality of the various components described herein.

Each computing device 502 includes one or more processors 504 coupled to a storage device 506, network interface 512, and I/O devices 514. In some embodiments, a computing device 502 may implement the functionality of more than one component of the system 100. In various embodiments, a computing device 502 may be a uniprocessor system including one processor 504, or a multiprocessor system including s processors 504 (e.g., two, four, eight, or another suitable number). Processors 504 may be any suitable processor capable of executing instructions. For example, in various embodiments, processors 504 may be general-purpose or embedded microprocessors implementing any of a variety of instruction set architectures ("ISAs"), such as the x86, PowerPC, SPARC, or MIPS ISAs, or any other suitable ISA. In multiprocessor systems, each of processors 504 may, but not necessarily, commonly implement the same ISA. Similarly, in a distributed computing system such as one that collectively implements the provider network 100, each of the computing devices 502 may implement the same ISA, or individual computing nodes and/or replica groups of nodes may implement different ISAs.

The storage device 506 may include a non-transitory, computer-readable storage device configured to store program instructions 508 and/or data 510 accessible by processor(s) 504. The storage device 506 also may be used to store the machine images as explained above. The storage device 506 may be implemented using any suitable volatile memory (e.g., random access memory), non-volatile storage (magnetic storage such as a hard disk drive, optical storage, solid storage, etc.). Program instructions 508 and data 510 implementing the functionality disclosed herein are stored within storage device 506. For example, instructions 508 may include instructions that when executed by processor(s) 504 implement the various services and/or other components of the service provider's network disclosed herein.

Secondary storage 516 may include additional volatile or non-volatile storage and storage devices for storing information such as program instructions and/or data as described herein for implementing the various aspects of the service provider's network described herein. The secondary storage 516 may include various types of computer-readable media accessible by the computing devices 502 via the network 518 A computer-readable medium may include storage media or memory media such as semiconductor storage, magnetic or optical media, e.g., disk or CD/DVD-ROM, or other storage technologies. Program instructions and data stored on the secondary storage 516 may be transmitted to a computing device 502 for execution by a processor 504 by transmission media or signals via the network 518, which may be a wired or wireless network or a combination thereof. Each of the components described herein may be implemented as a separate computing device 502 executing software to provide the computing node with the functionality described herein. In some embodiments, some or all of the various services may be implemented by the same computing device.

The network interface 512 may be configured to allow data to be exchanged between computing devices 502 and/or other devices coupled to the network 518 (such as other computer systems, communication devices, input/output devices, or external storage devices). The network interface 512 may support communication via wired or wireless data networks, such as any suitable type of Ethernet network, for example; via telecommunications/telephony networks such as analog voice networks or digital fiber communications networks; via storage area networks such as Fibre Channel SANS, or via any other suitable type of network and/or protocol.

Input/output devices 514 may include one or more display terminals, keyboards, keypads, touchpads, mice, scanning devices, voice or optical recognition devices, or any other devices suitable for entering or retrieving data by one or more computing devices 502. Multiple input/output devices 514 may be present in a computing device 502 or may be distributed on various computing devices 502 of the system 500. In some embodiments, similar input/output devices may be separate from computing device 502 and may interact with one or more computing devices 502 of the system 500 through a wired or wireless connection, such as over network interface 512.

References to "based on" should be interpreted as "based at least on." For example, if a determination of a value or condition is "based on" a value of Y, then the determination is based at least on the value of Y; the determination may be based on other values as well.

Those skilled in the art will also appreciate that in some embodiments the functionality disclosed herein may be provided in alternative ways, such as being split among more software modules or routines or consolidated into fewer modules or routines. Similarly, in some embodiments illustrated methods may provide more or less functionality than is described, such as when other illustrated methods instead lack or include such functionality respectively, or when the amount of functionality that is provided is altered. In addition, while various operations may be illustrated as being performed in a particular manner (e.g., in serial or in parallel) and/or in a particular order, those skilled in the art will appreciate that in other embodiments the operations may be performed in other orders and in other manners. The various methods as depicted in the figures and described herein represent illustrative embodiments of methods. The methods may be implemented in software, in hardware, or in a combination thereof in various embodiments. Similarly, the order of any method may be changed, and various elements may be added, reordered, combined, omitted, modified, etc., in various embodiments.

The above discussion is meant to be illustrative of the principles and various embodiments of the present disclosure. Numerous variations and modifications will become apparent to those skilled in the art once the above disclosure is fully appreciated. It is intended that the following claims be interpreted to embrace all such variations and modifications.

The claims are as follows:

1. A non-transitory computer readable medium comprising computer readable code executable by one or more processors to:
   train a first neural network to cluster a plurality of images to obtain a first photo embedding space, wherein a vector representation is determined for each of the plurality of images based on the training;
   determine an L2 norm value corresponding to each of the plurality of images based on the vector representation for each of the plurality of images;
   identify a first subset of the images for which a corresponding L2 norm value satisfies a predetermined L2 norm quality threshold; and
   train a second neural network using the first subset of the images to obtain a second image embedding space.

2. The non-transitory computer readable medium of claim 1, further comprising computer readable code to:
   identify one or more clusters in the second image embedding space, wherein each of the one or more clusters represent a subset of the plurality of images associated with common characteristics;
   determine a representative vector norm value for each of the one or more clusters;
   identify at least one cluster of the one or more clusters associated with a representative vector norm value that does not satisfy a predetermined cluster vector norm value threshold; and
   remove the one or more identified clusters from the second image embedding space.

3. The non-transitory computer readable medium of claim 1, further comprising computer readable code to:
   determine that a size of additional images is greater than a predetermined size threshold, wherein the predetermined size threshold is based on a memory capacity;
   determine a vector norm value for each of the additional images based on the second neural network;
   obtain a first subset of the additional images that satisfies the predetermined size threshold;
   embed the first subset of the additional images into the second image embedding space to obtain one or more clusters;
   obtain a second subset of the additional images; and
   assign one or more of the second subset of the additional images to at least one of the one or more clusters based on a distance between a representative vector for the one or more of the second subset of the additional images and the cluster.

4. A non-transitory computer readable medium comprising computer readable code executable by one or more processors to:
   obtain a vector representation for a plurality of images based on a first trained neural network;
   identify a first subset of the plurality of images for which a corresponding vector norm value satisfies a predetermined quality threshold; and
   train a second neural network using the first subset of the plurality of images to obtain an image embedding space.

5. The non-transitory computer readable medium of claim 4, further comprising computer readable code to utilize the image embedding space further comprises computer readable code to:
   provide the second neural network for categorization of additional images.

6. The non-transitory computer readable medium of claim 4, wherein the computer readable code to utilize the image embedding space further comprises computer readable code to:
   identify one or more clusters in the image embedding space based on a proximity of representations of each of the plurality of images;
   determine that at least one image of one or more additional images is within a predetermined threshold distance from one of the one or more clusters; and
   assign the at least one image of the one or more additional images to the one of the one or more clusters.

7. The non-transitory computer readable medium of claim 6, further comprising computer readable code to:
   obtain a label for the one of the one or more clusters; and
   apply the label to the at least one image of the one or more additional images based on the assignment.

8. The non-transitory computer readable medium of claim 4, further comprising computer readable code to:
   identify one or more clusters in the image embedding space, wherein each of the one or more clusters represent a subset of the plurality of images associated with common characteristics;
   determine a representative vector norm value for each of the one or more clusters;
   identify at least one cluster of the one or more clusters associated with a representative vector norm value that does not satisfy a predetermined cluster vector norm value threshold; and
   remove the one or more identified clusters from the image embedding space to obtain a modified image embedding space.

9. The non-transitory computer readable medium of claim 8, wherein the computer readable code to utilize the image embedding space further comprises computer readable code to utilize the modified image embedding space to categorize additional images.

10. A non-transitory computer readable medium comprising computer readable code to:
    obtain a vector representation for plurality of images based on a neural network;
    embed the plurality of images in an image embedding space based on the vector representation;
    identify a plurality of clusters in the image embedding space, wherein each of the plurality of clusters represent a subset of the plurality of images associated with common characteristics based on the vector representation for the plurality of images;
    determine a representative vector norm value for each of the plurality of clusters;
    identify at least one cluster of the plurality of clusters for which the representative vector norm value does not satisfied a predetermined cluster vector norm value threshold; and
    remove the at least one cluster from the image embedding space to obtain a modified image embedding space.

11. The non-transitory computer readable medium of claim 10, wherein the computer readable code to determine a representative vector norm value for each of the plurality of clusters further comprises computer readable code to:

determine an average vector norm value for each of the plurality of clusters based on vector norm values for vector representations in each of the plurality of clusters.

12. The non-transitory computer readable medium of claim 10, wherein the computer readable code to determine a representative vector norm value for each of the plurality of clusters further comprises computer readable code to:
identify a central vector representation for each of the plurality of clusters; and
determine a vector norm value for the central vector representation for each of the plurality of clusters.

13. The non-transitory computer readable medium of claim 10, wherein the computer readable code to utilize the modified image embedding space further comprises computer readable code to:
obtain a representative vector for each additional image; and
embed the additional images in the modified image embedding space based on the representative vector for each of the additional images.

14. The non-transitory computer readable medium of claim 13, wherein the computer readable code to embed the additional images further comprises computer readable code to:
determine that at least one image of the additional images is within a predetermined threshold distance from a first cluster of the plurality of clusters; and
assigning the at least one image of the additional images to the first cluster of the plurality of clusters.

15. The non-transitory computer readable medium of claim 14, further comprising computer readable code to:
obtain a label for the first cluster; and
apply the label to the at least one image of the additional images based on the assignment.

16. A non-transitory computer readable medium comprising computer readable code to:
obtain a plurality of images to be categorized utilizing a clustering algorithm;
determining that a size of the plurality of images is greater than a predetermined size threshold, wherein the predetermined size threshold is associated with a memory capacity;
determine a vector norm value for each of the plurality of images based on the clustering algorithm;
select a first subset of the plurality of images based on the vector norm values for each of the plurality of images, wherein a size of the first subset of the plurality of images satisfies the predetermined size threshold;
generate a first image embedding space in which the first subset of the plurality of images are embedded to obtain a first plurality of clusters;
obtain a second subset of the plurality of images; and
assign one or more images of the second subset of the plurality of images to one or more of the first plurality of clusters based on a threshold distance between a representative vector for each of the one or more images of the second subset of the plurality of images.

17. The non-transitory computer readable medium of claim 16, further comprising computer readable code to:
identify a plurality of remainder images of the second subset of the plurality of images based on a determination that the remainder images are not within the threshold distance to at least one of the first plurality of clusters;
select first subset of the plurality of remainder images based on the vector norm values for each of the plurality of remainder images, wherein a size of the first subset of the plurality of remainder images satisfies the predetermined size threshold;
generate a second image embedding space in which the first subset of the plurality of remainder images are embedded to obtain a second plurality of clusters;
obtain a second subset of the plurality of remainder images; and
assign one or more images of the second subset of the plurality of remainder images to one or more of the second plurality of clusters based on a threshold distance between a representative vector for each of the one or more images of the second subset of the plurality of remainder images.

18. The non-transitory computer readable medium of claim 17, further comprising computer readable code to:
identify a second plurality of remainder images of the second subset of the plurality of images based on determination that the second plurality of remainder images are not within a threshold distance to at least one of the second plurality of clusters;
determine that a size of the second plurality of remainder images satisfies the predetermined size threshold; and
in response to determining that the size of the second plurality of remainder images satisfies the predetermined size threshold, generate a third image embedding space in which the second subset of the plurality of remainder images are embedded.

19. The non-transitory computer readable medium of claim 16, further comprising computer readable code to:
assign one or more images of the second subset of the plurality of images to one or more of the first plurality of clusters;
obtain a label for the one of the one or more of the first plurality of clusters; and
apply the label to one or more images of the second subset of the plurality of images based on the assignment.

20. The non-transitory computer readable medium of claim 16, wherein the computer readable code to select the first subset of the plurality of images based on the vector norm values for each of the plurality of images further comprises computer readable code to:
rank the plurality of images based on the vector norm values for each of the plurality of images,
wherein the first subset of the plurality of images are selected for being associated with largest vector norm values of the vector norm values for each of the plurality of images.

* * * * *